US005221938A

United States Patent [19]

Kim

[11] Patent Number: 5,221,938

[45] Date of Patent: Jun. 22, 1993

[54] COLOR CATHODE RAY TUBE SCREEN EXPOSURE APPARATUS

[75] Inventor: Hong-seon Kim, Seoul, Rep. of Korea

[73] Assignee: Samsung Electron Devices Co., Ltd., Kyunggi, Rep. of Korea

[21] Appl. No.: 763,212

[22] Filed: Sep. 20, 1991

[30] Foreign Application Priority Data

Sep. 22, 1990 [KR] Rep. of Korea .................... 90-15050

[51] Int. Cl.[5] .............................................. G03B 41/00

[52] U.S. Cl. ...................................... 354/1; 250/492.1

[58] Field of Search ............. 354/1; 250/492.1, 504 R

[56] References Cited

U.S. PATENT DOCUMENTS 5,025,166 6/1991 Miyata et al. ........................... 354/1

*Primary Examiner*—David M. Gray

*Attorney, Agent, or Firm*—Leydig, Voit & Mayer

[57] ABSTRACT

This invention provides a color CRT screen exposing apparatus which collects light very effectively to make the most of the light for exposure and, more particularly, provides an improved exposing apparatus wherein the shape of light source can be easily arranged as desired resulting high and uniform illuminance on the faceplate. For this purpose, this invention comprises a housing with an opening at the center of its top whereon a faceplate for a color CRT is placed, as well as a lamp assembly for producing light, collecting means for collecting the light and a light transmission medium made of optical fiber or acrylate for transmitting the light from the collecting means to the inner surface of the faceplate.

8 Claims, 2 Drawing Sheets

COLOR CATHODE RAY TUBE SCREEN EXPOSURE APPARATUS

BACKGROUND OF THE INVENTION

This invention relates generally to a color cathode ray tube (CRT) screen exposure apparatus. More particularly, this invention is directed to an improved apparatus for effectively obtaining high and uniform luminance having desired light source pattern. A color CRT screen exposure apparatus is generally constructed in a housing 1 as briefly shown in FIG. 1. The housing 1 is provided with a lamp assembly 2 on its bottom side and a top 1*a* at its upper end for placing a faceplate P for a color CRT. Between the lamp assembly 2 and the faceplate p, a correction lens 3 for correcting the path of light irradiated by the lamp assembly 2 and a filter 4 for controlling the luminance of light are installed. A shutter 5 containing a slit 5*a* which partially passes light from the source is located between the correction lens 3 and the lamp assembly 2. In the FIG. 2, the lamp assembly 2 is shown as being constructed with a cooling chamber 21 having a round cavity 22 at its center and a high luminance mercury lamp 23 passing through the cooling chamber 21 and traversing the round cavity 22 to expose its body and a pair of regulators 24 located on both sides of the round cavity 22 regulating the exposing width of the lamp 23.

Since the high luminance mercury lamp 23 in the conventional color CRT exposure apparatus constructed as above is installed parallel to the longitudinal side of the faceplate exposing its body of a certain width as determined by the regulator 24 in the cooling chamber 21 having a round cavity 22 at the center thereof, the faceplate P can not be sufficiently irradiated by the source. Thus, exposure has to be made for a relatively longer period to have enough light land on the faceplate P. In addition, since the light source is of the cylindric shape, the luminance on every part of the faceplate P even at the same distance from the light source appears minutely irregular subject to angles formed between each part of the light source and the faceplate P, so that the quality of phosphor screen is degraded. The screen is further deteriorated by the presence of striped figure caused by light diffraction and interference at the regulator 24.

It is the object of the present invention to provide an improved color CRT exposure apparatus for concentrating light more efficiently in order to make the most of light for exposure and, more specifically, for establishing more desirable pattern of light source.

SUMMARY OF THE INVENTION

To accomplish the above object, the present invention provides a color CRT exposure apparatus comprising a housing with an opening at the center of its top whereon a faceplate for color CRT is placed, a lamp assembly for producing light, means for concentrating light produced by the lamp assembly and a light transmission medium made of optical fiber or acrylate for transmitting the light concentrated by the concentrating means to the inner surface of the faceplate.

DETAILED DESCRIPTION OF THE PREFERRED EMBODIMENT

Figure 1:
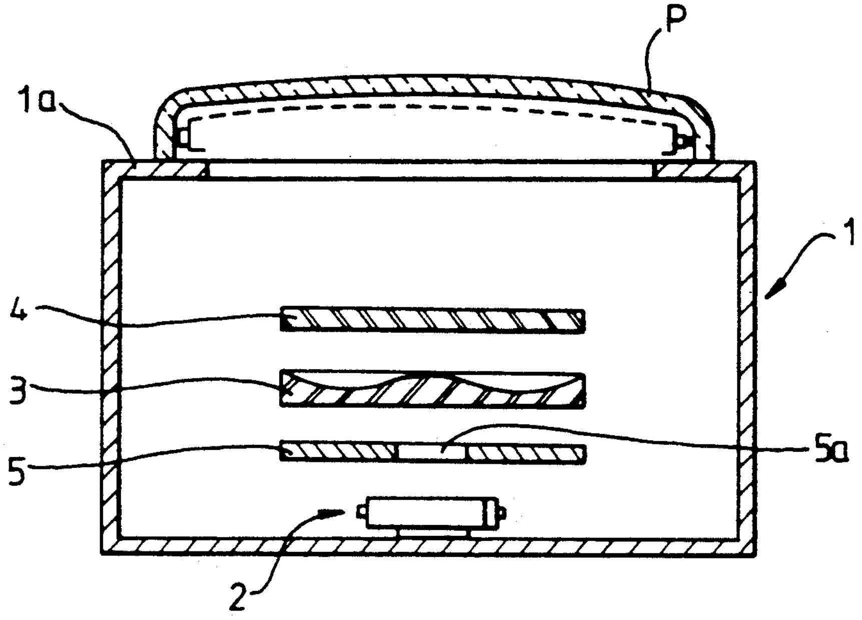
FIG. 1 is a brief sectional view of a conventional color CRT screen exposure apparatus.
Figure 2:
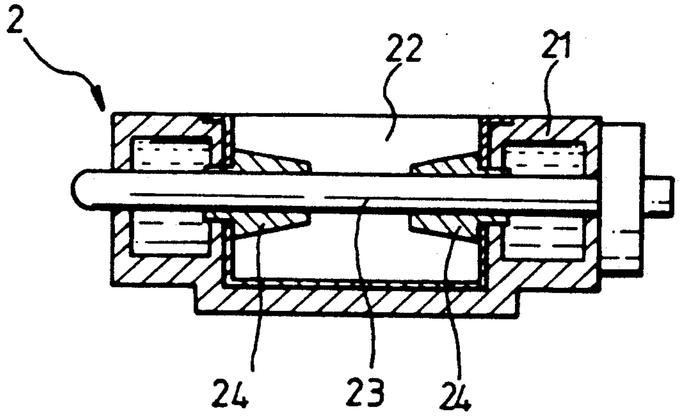
FIG. 2 is an enlarged sectional view of a lamp assembly extracted from the exposure apparatus illustrated in FIG. 1.
Figure 3:
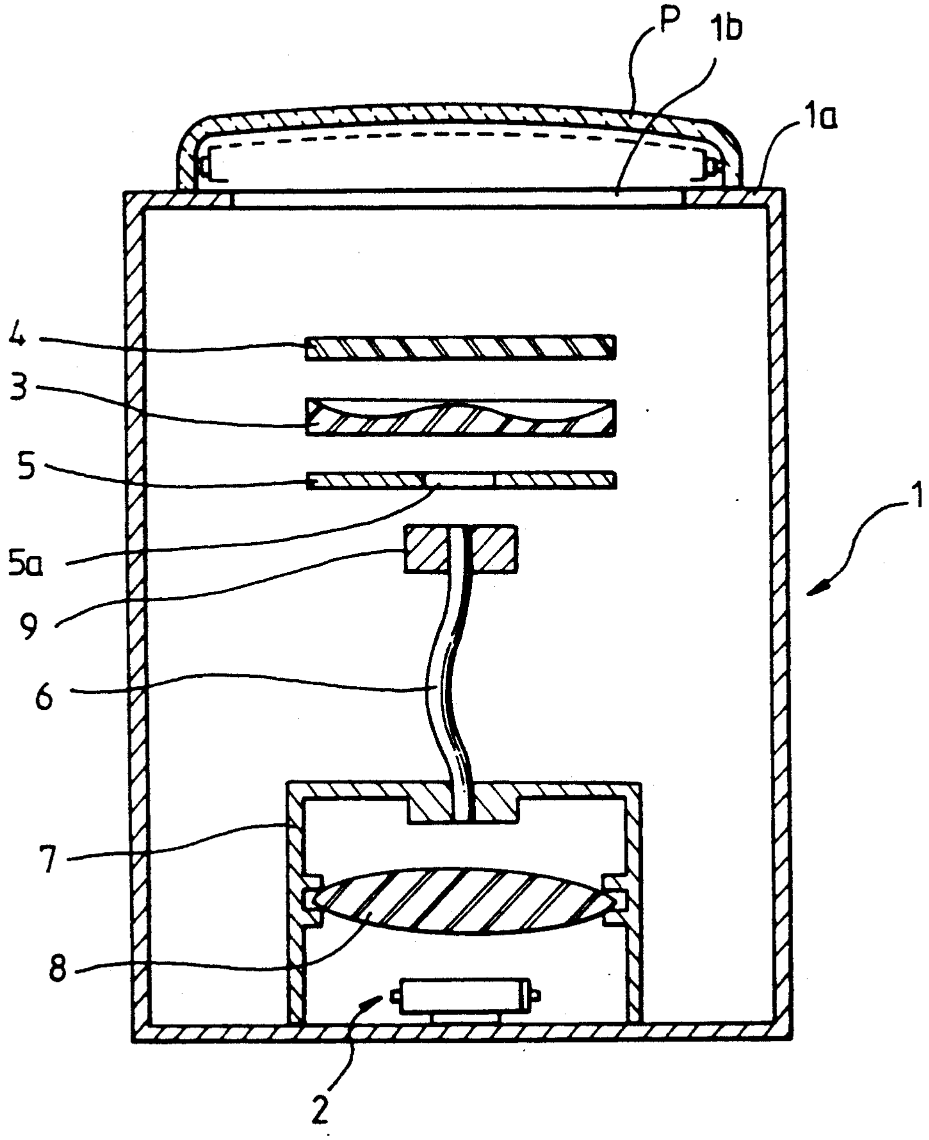
FIG. 3 is a brief sectional view of a color CRT screen exposure apparatus according to the present invention.

According to FIG. 3, a top 1*a* on which a faceplate P is placed is arranged on the upper end of a housing 1, having an opening 1*b* leading to the internal space at its center.

At the center of the bottom side of the housing 1 just perpendicular to the opening 1*b* is arranged a collecting chamber 7 wherein a lamp assembly 2 is positioned.

Unlike the conventional one, the lamp assembly 2 contains no regulator which intentionally cuts off the irradiation of the light. In the space between the collecting chamber 7 and the opening 1*b*, a correction lens 3 and a filter 4 are arranged in upward order. Meanwhile, a shutter 5 having slit 5*a* which partially passes the light is installed between the correction lens 3 and the collecting chamber 7.

Figure 4:
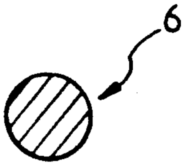
FIGS. 4 and 5 show shapes of light source.

In the internal space of the collecting chamber 7 a collection lens 8 is disposed for collecting the light produced by the lamp assembly 2. A light transmission medium 6 made of optical fiber or acrylate is provided for receiving the light collected by the collection lens 8 and passing it to the faceplate P. This light transmission medium 6 having a circular section as shown in FIG. 4 receives the light from the collecting lens 8 through its lower end penetrating the top side of the collecting chamber 7 and passes the light to the faceplate P through its upper end held by an adjustor 9 working as a light source right under the center of the faceplate P.

The light transmission medium 6 is made of a single material or of a bundle of multiple optical fibers or acrylates. When the upper end of the light transmission medium 6 has a circular section, it forms a circular light source. The adjustor 9 is preferably rotatable around a certain pivotal point so it rotates according to the shutter's 5 translational movement.

Accordingly, a color CRT screen exposure apparatus as structured above, has the collection lens 8 arranged in the collection chamber 7 aligned on the same axis as the lamp 23 in the lamp assembly 2.

The light produced by the lamp assembly 2 is concentrated by the collection lens 8 in the collection chamber 7 and then the concentrated light is led to the top side of the collection chamber 7 at which the lower end of the light transmission medium 6 is positioned penetrating the top side of the collection chamber 7 while its upper end is placed right under the faceplate.

The light guided as above is radiated toward the faceplate P through the light transmission medium 6 which is controlled by the adjustor 9 to rotate according to the shutter 5 to face a certain part of the phosphor screen selected by the shutter 5 for exposure. This radiated light reaches to the inner surface of the faceplate P sequentially through the shutter 5, correction lens 3 and filter 4.

The light landing on the inner surface of the faceplate P is of a very high luminance as it is the light which has been guided through the light transmission medium 6 after being concentrated by the collection lens 8. Consequently, the exposure can be accomplished within a relatively shorter period of time than that of the conventional device while the luminance on the faceplate P appears uniform as there is no difference of angle formed at the same distance between the light source and each part of the faceplate P to be illuminated.

Figure 5:
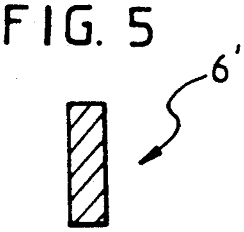

In the CRT exposure apparatus of this invention, it is also possible to easily control the shape of the light source by altering the shape of the light transmission medium's upper end section facing the faceplate in accordance with the type of phosphor layer on the screen, i.e., dot or stripe type. FIG. 5 shows the upper end section 6' of the light transmission medium 6 which is altered to be an elongated rectangle. In addition, the apparatus of this invention does not need a regulator to shift the exposing width of the lamp assembly 2 so the screen stripe nonuniformity and edge indefinition of the conventional apparatus do not appear.

The color CRT screen exposure apparatus disclosed as above is able of obtaining a high luminance by collecting the light produced by the lamp assembly without any losses to shorten the exposure time and also is adjustable to both dot and stripe types with simple change of the shape of the optical fiber's section. In particular, a high quality screen is available as this invention provides a pattern of light source as desired.

What is claimed is:

1. A color cathode ray tube screen exposing apparatus comprising:

a housing having an opening at the center of a top whereon a faceplate for a color cathode ray tube is disposed;

a lamp assembly positioned within said housing for producing light;

collecting means for collecting light produced by said lamp assembly; and a light transmission medium connected to said collecting means for transmitting light collected by said collecting means;

a translatable shutter having a slit to partially pass light output from said light transmission medium; and an adjuster connected to said light transmission means which rotates according to translation of said shutter to guide light output from said light transmission medium to the faceplate so that the faceplate is exposed according to translation of said shutter.

2. A color cathode ray tube screen exposing apparatus as claimed in claim 1, wherein said collecting means comprises a collecting chamber which houses lamp assembly and collection lens disposed in said collecting chamber for continuously concentrating the light from said lamp assembly to said light transmission medium.

3. A color cathode ray tube screen exposure apparatus as claimed in claim 2, wherein said light transmission medium comprises optical fiber having a lower end penetrating through said collecting means and an upper end facing said faceplate.

4. A color cathode ray tube screen exposure apparatus as claimed in claim 2, wherein said light transmission medium comprises acrylate having a lower end penetrating through said collecting means and an upper end facing said faceplate.

5. A color cathode ray tube screen exposure apparatus as claimed in claim 3, wherein the upper end of said light transmission medium has a circular cross section.

6. A color cathode ray tube screen exposure apparatus as claimed in claim 3, wherein the upper end of said light transmission medium has an elongated rectangular cross section.

7. A color cathode ray tube screen exposure apparatus as claimed in claim 4, wherein the upper end of said light transmission medium has a circular cross section.

8. A color cathode ray tube screen exposure apparatus as claimed in claim 4, wherein the upper end of said light transmission medium has an elongated rectangular cross section.

* * * * *